United States Patent
Ishimaru et al.

(10) Patent No.: US 12,509,564 B2
(45) Date of Patent: Dec. 30, 2025

(54) HEAT-SHRINKABLE POLYESTER-BASED FILM ROLL

(71) Applicant: TOYOBO CO., LTD., Osaka (JP)

(72) Inventors: Shintaro Ishimaru, Tsuruga (JP); Masayuki Haruta, Tsuruga (JP)

(73) Assignee: TOYOBA CO., LTD., Osaka (JP)

(*) Notice: Subject to any disclaimer, the term of this patent is extended or adjusted under 35 U.S.C. 154(b) by 255 days.

(21) Appl. No.: 18/003,752

(22) PCT Filed: Jul. 1, 2021

(86) PCT No.: PCT/JP2021/024994
§ 371 (c)(1),
(2) Date: Dec. 29, 2022

(87) PCT Pub. No.: WO2022/009780
PCT Pub. Date: Jan. 13, 2022

(65) Prior Publication Data
US 2023/0257533 A1    Aug. 17, 2023

(30) Foreign Application Priority Data
Jul. 9, 2020  (JP) .............................. 2020-118579

(51) Int. Cl.
*B29C 61/02*    (2006.01)
*B29C 55/08*    (2006.01)
(Continued)

(52) U.S. Cl.
CPC ............... *C08J 5/18* (2013.01); *B29C 55/08* (2013.01); *B29C 61/003* (2013.01); *B29C 61/02* (2013.01);
(Continued)

(58) Field of Classification Search
CPC ...... C08J 5/18; C08J 2367/02; C08J 2467/02; B29C 55/08; B29C 61/003; B29C 61/02;
(Continued)

(56) References Cited

U.S. PATENT DOCUMENTS

| | | | |
|---|---|---|---|
| 2003/0165658 A1 | 9/2003 | Hayakawa et al. | |
| 2004/0191493 A1* | 9/2004 | Hayakawa | ........... C08K 5/0091 428/220 |

(Continued)

FOREIGN PATENT DOCUMENTS

| | | |
|---|---|---|
| JP | 2003-170494 A | 6/2003 |
| JP | 2005-178396 A | 7/2005 |

(Continued)

OTHER PUBLICATIONS

European Patent Office, Extended European Search Report in European Patent Application No. 21837325.6 (Mar. 15, 2024).
(Continued)

*Primary Examiner* — Donald M Flores, Jr.
(74) *Attorney, Agent, or Firm* — Leydig, Voit & Mayer, Ltd.

(57) ABSTRACT

[PROBLEMS] It is an object of the present invention to provide a heat-shrinkable polyester-based film roll which can reduce defects caused during a heat shrinking step due to the variation of a heat shrinkage rate in the heat-shrinkable polyester-based film roll having the longitudinal direction as the main shrinkage direction, specifically, defects of the film when covering an object by a wrap-around method and heat-shrunk. [SOLUTIONS] A heat-shrinkable polyester-based film roll, comprising a core; and a heat-shrinkable polyester-based film having a longitudinal direction as a main shrinkage direction that is wound around the core; wherein the film (roll) satisfy predetermined polyester composition, and all samples cutout every about 100 m have a
(Continued)

heat shrinkage rate measured by immersion in hot water of 90° C. for 10 seconds of 30% or more and 80% or less and ±3% or less of an average in the longitudinal direction.

7 Claims, 3 Drawing Sheets

(51) Int. Cl.
*B29C 61/00* (2006.01)
*C08J 5/18* (2006.01)
*B29K 67/00* (2006.01)

(52) U.S. Cl.
CPC ..... *B29K 2067/003* (2013.01); *B29K 2995/0049* (2013.01); *C08J 2367/02* (2013.01)

(58) Field of Classification Search
CPC ... B29C 55/12; B29C 61/06; B29K 2067/003; B29K 2995/0049; Y10T 428/26
See application file for complete search history.

(56) References Cited

U.S. PATENT DOCUMENTS

| | | | |
|---|---|---|---|
| 2005/0095379 A1* | 5/2005 | Hayakawa | B29C 61/003 |
| | | | 428/480 |
| 2005/0236731 A1 | 10/2005 | Hayakawa et al. | |
| 2008/0284057 A1 | 11/2008 | Hayakawa et al. | |
| 2018/0229422 A1 | 8/2018 | Inoue et al. | |

FOREIGN PATENT DOCUMENTS

| | | |
|---|---|---|
| JP | 2019-111824 A | 7/2019 |
| JP | 2019-123252 A | 7/2019 |

OTHER PUBLICATIONS

Japan Patent Office, International Search Report in International Patent Application No. PCT/JP2021/024994 (Aug. 24, 2021).
Indonesian Directorate General of Intellectual Property, Office Action in Indonesian Patent Application No. P00202301084 (Jun. 20, 2025).
China National Intellectual Property Administration, Office Action in Chinese Patent Application No. 202180047730.5 (Sep. 3, 2025).
Korean Intellectual Property Office, Office Action in Korean Patent Application No. 10-2023-7002499 (Oct. 16, 2025).

* cited by examiner

HEAT-SHRINKABLE POLYESTER-BASED FILM ROLL

TECHNICAL FIELD

The present invention relates to a film roll obtained by winding a heat-shrinkable polyester-based film. Specifically, the present invention relates to a heat-shrinkable polyester-based film roll having much less occurrence of defects such as insufficient shrinkage, shrinkage spots, wrinkles, distortion, and longitudinal sink mark known as "tatehike", caused during a post-processing step by the variation of a heat shrinkage rate in a heat-shrinkable film roll.

BACKGROUND ART

In recent years, stretched films (so-called heat-shrinkable films) made of polyvinyl chloride-based resins, polystyrene-based resins, polyester-based resins, and the like have been widely used for applications such as label packaging to protect glass or PET bottles and display products information, cap sealing, or integrated packaging. Among such heat-shrinkable films, polyvinyl chloride-based films have low heat resistance, and causes hydrogen chloride gas and dioxins during incineration. Polystyrene-based films have poor solvent resistance and thus require inks of special composition for printing, need to be incinerated at high temperatures, and disadvantageously cause a large amount of black smoke with an offensive odor during incineration. Therefore, polyester-based heat-shrinkable films, which have high heat resistance, are easily incinerated, and have excellent solvent resistance, have been widely used as shrinkable labels, and the use amount thereof has been increasing with an increase in the distribution amount of PET containers.

A heat-shrinkable polyester-based films shrinking significantly in a width direction has been widely used. Application of heat-shrinkable polyester-based films as a label film for a bottle or a banding film for binding a lunchbox container requires forming the film into an annular-shape, covering the bottle or the lunchbox container with the annular-shaped film, and heat-shrinking of the film in the circumferential direction. Therefore, covering by the banding film made of the heat-shrinkable film having a heat-shrinkage direction in a width direction needs to form an annular shape so that the width direction of the film becomes a circumferential direction, then the annular-shaped film is cut at every prescribed length and the cut annular shaped film needs to cover a bottle or a lunchbox container by hand-covering. Therefore, high-speed mounting of the label film or the banding film to a bottle or a lunchbox container cannot be attained by the heat-shrinkable film having heat-shrinking direction in the width direction. Thus, a film that heat-shrinks in the longitudinal direction can wrap and cover a bottle or a lunchbox container directly from a film roll (so-called wrap-around method) has recently been invented (for example, PTL 1). Such a film does not require processes such as center-sealing process for sealing the annular-shaped film, cutting, and hand-covering, enabling high-speed mounting.

Mostly, these heat-shrinkable films are wound into a roll after production, and used in the form of film rolls. This film roll is cut as necessary to the size of a label for a final product, and is formed to annular shape (hereinafter, also referred to as "a label") through sealing both ends of the film (in the case of the longitudinally shrinking film, both ends in the longitudinal direction) by solvent adhesion or heat sealing. The label then tightly covers a container by heating.

The heating method for the label include the following two types, heat-shrinking method by blowing steam (steam tunnel) and heat-shrinking method by blowing hot air (hot air tunnel). These heat shrinking steps are completed by placing the label on an annexed conveyor belt and passing the label through these heating tunnels.

Meanwhile, the heating conditions in the tunnel are the constant in the heat shrinking step, so the labels having large variation of heat shrinkage rate leads to increased occurrence of labels not exhibiting an appropriate heat shrinkage rate. These labels cause appearance defects due to insufficient shrinkage, shrinkage spots, wrinkles, distortion of designs, and sink mark, leading to inappropriate final products.

Since the labels of uniform properties are usually produced from one film roll, a large difference in heat shrinkage rate of a film wound into one film roll caused increased defect rate in the heat shrinking step. These defects are problems common to all the materials such as the aforementioned vinyl chloride-based resins, polystyrene-based resins, and polyester-based resins. For example, PTL2 discloses a heat-shrinkable polyester-based film roll having main shrinkage direction in a longitudinal direction, but does not disclose the variation of the shrinkage rate in the roll.

PTL 3 discloses a heat-shrinkable polyester-based film roll characterized in that the heat shrinkage rate at 85° C. in the maximum shrinkage direction (main shrinkage direction) over the longitudinal direction is 20% or more over the overall roll length. In PTL 3, the variation of the heat shrinkage rate over the overall film roll length is successfully suppressed by controlling the method for supplying the raw material. However, in all Examples in PTL 3, the main shrinkage direction is the width direction, and there is no mention of means for controlling the variation of the shrinkage rate of a film roll having a main shrinkage direction as a longitudinal direction. A heat-shrinkable film normally needs to be stretched in a direction desired to have developed heat shrinkage rate. Thus, a heat-shrinkable film desired to have a longitudinal direction as a main shrinkage direction needs to be stretched in the longitudinal direction. In order to reduce the variation of the heat shrinkage rate in the longitudinal direction, it is necessary to control the method for stretching in the longitudinal direction in addition to the aforementioned method for supplying the raw material. Furthermore, the technology of PTL 3 was disclosed more than 15 years ago, and at present, further reduction of the variation of the heat shrinkage rate is required. The variation of the heat shrinkage rate in the longitudinal direction could not be suppressed to current desired level only by the technology of PTL 3.

PRIOR ART DOCUMENT

Patent Document

PTL1: JP-A-2019-111824
PTL2: JP-A-2019-123252
PTL3: JP-A-2003-170494

SUMMARY OF THE INVENTION

Problems to be Solved by the Invention

It is an object of the present invention to provide a heat-shrinkable polyester-based film roll which can reduce defects caused during a heat shrinking step due to the variation of a heat shrinkage rate in the heat-shrinkable polyester-based film roll having the longitudinal direction as the main shrinkage direction, specifically, defects of the film when covering an object by a wrap-around method and heat-shrunk.

Solution to the Problems

The present invention has the following features.
1. A heat-shrinkable polyester-based film roll, comprising
    a core; and
    a heat-shrinkable polyester-based film having a longitudinal direction as a main shrinkage direction that is wound around the core;
    wherein the heat-shrinkable polyester-based film and the heat-shrinkable polyester-based film roll satisfy the following requirements (1) to (3);
    (1) the film comprises a polyester including ethylene terephthalate as a main constituent component, and at least one polyhydric alcohol selected from a group consisting of 1,4-cyclohexanedimethanol, neopentyl glycol, 1,4-butanediol, diethylene glycol, and 1,3-propanediol;
    (2) all the test piece films with a square of 10 cm×10 cm have a heat shrinkage rate in the longitudinal direction of 30% or more and 80% or less by immersion in hot water of 90° C. for 10 seconds followed by immersion in water of 25° C. for 10 seconds, wherein the test piece films are cutout at a center position in a roll width direction, and includes
    a first sample that is cutout from the portion provided at a position within 2 m on an inner side of a second end portion provided at the end of the film roll on a winding end side (the surface layer side),
    a final sample that is cutout from the portion provided at a position within 2 m on the inner side of a first end portion provided at the end of the film roll on a winding start side (core side), and
    the other samples that are cutout from the portion provided every about 100 m from the first sample cutout portion.
    (3) all the test piece films have a heat shrinkage rate in the longitudinal direction of ±3% or less of an average heat shrinkage rate calculated from the heat shrinkage rates in the longitudinal direction measured by the method described in above (2).
2. The heat-shrinkable polyester-based film roll according to 1, further satisfying the following requirements (4) and (5);
    (4) all the test piece films have a heat shrinkage rate in a width direction corresponding to a direction orthogonal to the longitudinal direction of −20% or more and 20% or less measured by the method described in above (2);
    (5) all the test piece films have a heat shrinkage rate in the width direction of ±3% or less of an average heat shrinkage rate calculated from the heat shrinkage rate in the width direction measured by the method described in above (2).
3. The heat-shrinkable polyester-based film roll according to 1 or 2, wherein the film has an effective winding length of 1000 m or more and 20000 m or less.
4. The heat-shrinkable polyester-based film roll according to any one of 1 to 3, wherein the film has a width of 300 mm or more and 2500 mm or less.
5. The heat-shrinkable polyester-based film roll according to any one of 1 to 4, wherein the film has a thickness of 5 μm or more and 100 μm or less.

Effect of the Invention

The heat-shrinkable polyester-based film roll of the present invention having the longitudinal direction as the main shrinkage direction has less variation of the heat shrinkage rate in the roll, enabling reduced defects of final products.

MODE FOR CARRYING OUT THE INVENTION

The present inventors have examined the variation of a heat shrinkage rate in a roll and found two main causes for this variation. The first cause is that two or more types of raw materials (polymer blend) are used in a raw material supply step, and the second cause is that variation of molecular orientation due to stretching occurs in a longitudinal stretching step. The present inventors have found that the heat-shrinkable polyester-based film roll according to the present invention has small variation of the heat shrinkage rate and barely causes the above defects. Hereinafter, the present invention will be described in detail.

The "longitudinal direction" in the present invention indicates a direction of a film wound into a film roll.

1. Physical Properties of Film Roll 1.1. Heat Shrinkage Rate in Longitudinal Direction (Main Shrinkage Direction)

The heat-shrinkable polyester-based film roll of the present invention satisfies the following requirements (2) and (3) in all the test piece films, wherein the test piece films are cutout at a center position in a roll width direction, and includes a first sample that is cutout from the portion provided at a position within 2 m on an inner side of a second end portion provided at the end of the film roll on a winding end side (the surface layer side); a final sample that is cutout from the portion provided at a position within 2 m on the inner side of a first end portion provided at the end of the film roll on a winding start side (core side); and the other samples that are cutout from the portion provided every about 100 m from the first sample cutout portion.

(2) all the test piece films with a square of 10 cm×10 cm prepared from the cutout portion have a heat shrinkage rate in the longitudinal direction of 30% or more and 80% or less by immersion in hot water of 90° C. for 10 seconds followed by immersion in water of 25° C. for 10 seconds.

(3) all the test piece films have a heat shrinkage rate in the longitudinal direction of ±3% or less of an average heat shrinkage rate calculated from the heat shrinkage rates in the longitudinal direction measured by the method described in above (2).

Test piece films are selected at substantially equal intervals over the overall length of the stationary region of the film that wound into a single roll by being cutout at a center position in a roll width direction, and includes a first sample that is cutout from the portion provided at a position within 2 m on an inner side of a second end portion provided at the end of the film roll on a winding end side (the surface layer side); a final sample that is cutout from the portion provided at a position within 2 m on the inner side of a first end portion provided at the end of the film roll on a winding start side (core side); and the other samples that are cutout from the portion provided every about 100 m from the first sample cutout portion. The term "Every about 100 m" means that a sample may be cut out at about 100 m±1 m.

The above sampling method will be described in more detail. For example, in case where a heat-shrinkable film having a film length of 498 m is wound into a roll, a first sample A (10 cm×10 cm) is cut out at a center portion in the roll width direction, within 2 m from the winding end of the film. For convenience, the square-shaped test piece is cut out in the directions where one direction is along the longitudinal direction of the film and the other direction is along a direction (width direction) orthogonal to the longitudinal direction (not cut out diagonally). Then, a second sample B is cut out at a center portion in the roll width direction, which is longitudinally 100 m away from the first cut out portion. Similarly, a third sample C is cut out at about 200 m, a fourth sample D is cut out at about 300 m, and a fifth sample E is cut out at about 400 m. Here, the remaining portion of the film is shorter than 100 m, a sixth (final) sample F may be cut out from any portion within 2 m from the winding start of the film.

The requirement (2) of the present invention indicates that all the samples cut out as described above have the heat shrinkage rates at 90° C. in the longitudinal direction of 30% or more. The heat shrinkage rate in the longitudinal direction of the film of less than 30% leads to insufficient thermal shrinkage of the film and thus causes the film not to be tightly mounted after covering and heat-shrinking around a container, resulting in undesirable appearance defect. The heat shrinkage rate in the longitudinal direction is more preferably 35% or more, and further preferably 40% or more. Applicability of the film increases with an increase in the heat shrinkage rate in the longitudinal direction, however, the technical level of the present invention leads to the upper limit of 80%. Practically, the upper limit of 75% is sufficient.

The requirement (3) of the present invention specifies that all the test piece films have a heat shrinkage rate in the longitudinal direction ranged within ±3% or less of the average heat shrinkage rate calculated from the heat shrinkage rates in the longitudinal direction measured by the method described in above (2). The heat shrinkage rate is preferably within a range of ±2.8%, and more preferably within a range of ±2.6%. The meaning of being within a range of the average±3% will be described in more detail.

First, a heat shrinkage rate is measured for each cut-out sample, and the average value in the longitudinal direction is calculated. The average value of the heat shrinkage rates in the longitudinal direction is denoted by X (%) and the heat shrinkage rate in the longitudinal direction of the above sample A is denoted by Y1(%), and the meaning of being the average±3% is that the absolute value of X−Y1 expressed by |X−Y1| is less than 3(%), and the absolute value |X−Yn| of the samples B to F having the heat shrinkage rates Y2 to Y6(%), respectively, is similarly less than 3(%). In brief, when both of the difference between a maximum value Ymax of Yn and X and the difference between a minimum value Ymin of Yn and X is within ±3%, the requirement of the present invention is satisfied. As the measurement temperature of 90° C. of the heat shrinkage rate means, according to the present invention, the variation of the heat shrinkage rate in the longitudinal direction at a temperature of 90° C. can be reduced. Therefore, an annular body produced from the film roll can be mounted to an object (container) and heat-shrunk at about 90° C. without occurrence of shrinkage defects.

1.2. Heat Shrinkage Rate in Width Direction (Direction Orthogonal to Main Shrinkage Direction)

The test pieces of the heat-shrinkable polyester-based film wound into the heat-shrinkable polyester-based film roll of the present invention prepared by the sampling method described in (1) of "1.1 Heat shrinkage rate in longitudinal direction (main shrinkage direction)" satisfy the following requirements (4) and (5).

(4) all the test piece films with a square of 10 cm×10 cm prepared from the cutout portion have a heat shrinkage rate in a width direction of −20% or more and 20% or less measured by immersion in hot water of 90° C. for 10 seconds followed by immersion in water of 25° C. for 10 seconds.

(5) all the test piece films have a heat shrinkage rate in the width direction of ±3% or less of an average heat shrinkage rate calculated from the heat shrinkage rate in the width direction measured by the method described in (1).

The annular-shaped heat-shrinkable polyester-based film after shrinking has the heat shrinkage rate in the width direction of preferably closer to zero, which enables no changes of the dimension in an undesired direction (non-shrink direction). The heat shrinkage rate in the width direction of the film of exceeding 20% (the above requirement (3)) causes the film made into a label to have significantly short length in the non-shrink direction. The heat shrinkage rate in the width direction is more preferably 19% or less, and further preferably 18% or less. Negative heat shrinkage rate in the width direction means that the film stretches in the non-shrink direction. The heat shrinkage rate in the width direction of less than −20% changes the dimension of the film in the non-shrink direction after the film is shrunk as a label. The heat shrinkage rate in the width direction is preferably −19% or more, and more preferably −18% or more.

In the present invention, all the test piece films have a heat shrinkage rate in the width direction ranged within ±3% of the average heat shrinkage rate calculated from the shrinkage rates in the width direction based on all the samples from the cutout portions. The heat shrinkage rate is preferably within a range of 2.8%, and more preferably within a range of ±2.6%. As the measurement temperature of 90° C. of the heat shrinkage rate means, according to the present invention, the variation of the heat shrinkage rate in the width direction at a temperature of 90° C. can be reduced. Therefore, an annular body produced from the film roll can cover an object (container) and be heat-shrunk at about 90° C. without occurrence of shrinkage defects.

1.3. Refractive Index

The test pieces of the heat-shrinkable polyester-based film wound into the heat-shrinkable polyester-based film roll of the present invention prepared by the sampling method described in (2) of "1.1 Heat shrinkage rate in longitudinal direction (main shrinkage direction)" preferably satisfy that all the test piece films have a refractive index Nx in the longitudinal direction within a range of 0.01 or less of an average refractive index Nx calculated from the refractive index Nx in the longitudinal direction. The range is preferably within ±0.009, and more preferably within ±0.008. The refractive index indicates the degree of orientation of the polymer chains forming the film, and also indicates the degree of stretching of the film. In general, the heat shrinkage rate of a heat-shrinkable polyester-based film increases with the increase in degree of orientation of the molecular chains generated by stretching. In the present invention, small variation of Nx in the longitudinal direction of the film roll will suppress the variation of the heat shrinkage rate in the film roll.

1.4. Thickness

The heat-shrinkable polyester-based film wound into the heat-shrinkable polyester-based film roll of the present invention preferably has a thickness of 5 μm or more and 100 μm or less. The thickness exceeding 100 μm uneconomically merely increases the weight per area of the film. The thickness of less than 5 μm significantly decreases the film thickness, leading to difficulties in handling of the film (poor handleability) in a step of making an annular-shaped film. The thickness is preferably 7 μm or more and 98 μm or less, and more preferably 9 μm or more and 96 μm or less.

2. Type and Amounts of Polyester Raw Material Forming Film Roll

The polyester raw material forming the film of the present invention comprises an ethylene terephthalate unit as a main constituent component. The term "as a main constituent component" indicates that the constituent component is contained in 50 mol % or more of the total constituent component of 100 mol %. The ethylene terephthalate unit is a unit consisting of ethylene glycol and terephthalic acid. The heat-shrinkable polyester-based film wound into the heat-shrinkable polyester-based film roll of the present invention comprises the ethylene terephthalate unit preferably by 55 mol % or more and more preferably by 60 mol % or more in 100 mol % of the constituent unit of the polyester.

The polyester needs to comprise at least one polyhydric alcohol selected from 1,4-cyclohexanedimethanol, neopentyl glycol, 1,4-butanediol, diethylene glycol, and 1,3-propanediol as a diol component other than ethylene glycol. The diol components can be amorphous, and are required to attain a heat shrinkage rate of 30% or more at 90° C. In addition to them, the polyester may comprise propylene glycol, an aromatic diol such as bisphenol A and an aliphatic diol such as hexanediol.

The total amount of the amorphous component is preferably 10 mol % or more and more preferably 20 mol % or more in 100 mol % of the polyhydric alcohol component in the entire polyester resin. The amorphous component of less than 10% will prevent the required shrinkage rate from being attained, leading to insufficient shrinkage of a final product. In contrast, the main constituent component is ethylene terephthalate (50 mol %), and that leads to the upper limit of the amorphous component to be 50 mol %. Significantly large amount of the amorphous component undesirably causes the variation of molecular orientation during stretching in the longitudinal direction described later. The amount of the amorphous component is preferably 45 mol % or less, and more preferably 40 mol % or less.

The test pieces of the heat-shrinkable polyester-based film wound into the heat-shrinkable polyester-based film roll of the present invention prepared by the sampling method described in (2) of "1.1 Heat shrinkage rate in longitudinal direction (main shrinkage direction)" preferably satisfy that all the test piece films have the amorphous component in an amount within a range of ±2 mol % or less of an average amount of the amorphous component calculated from a composition ratio (mol %). The amount of the amorphous component adjusted within a range of ±2 mol % of an average will lead to the variation of the heat shrinkage rate of the heat-shrinkable polyester-based film roll controlled within a predetermined range. The amount of the amorphous component is more preferably within a range of ±1.5 mol % of the average, and further preferably within a range of ±1 mol % of the average.

In addition to terephthalic acid, examples of the dicarboxylic acid components forming the polyester of the present invention include aromatic dicarboxylic acids such as isophthalic acid, naphthalenedicarboxylic acid, and orthophthalic acid; aliphatic dicarboxylic acids such as adipic acid, azelaic acid, sebacic acid, and decanedicarboxylic acid; and alicyclic dicarboxylic acids.

In case where the polyester comprises an aliphatic dicarboxylic acid (for example, adipic acid, sebacic acid, decanedicarboxylic acid, etc.), the content of the aliphatic dicarboxylic acid is preferably less than 3 mol % (in 100 mol % of a dicarboxylic acid component). A heat-shrinkable polyester-based film produced from a polyester comprising 3 mol % or more of these aliphatic dicarboxylic acids will have insufficient stiffness during high-speed mounting.

The polyester is preferably free from a trivalent or higher polycarboxylic acid (for example, trimellitic acid, pyromellitic acid and an anhydride thereof). A heat-shrinkable polyester-based film produced from the polyester comprising the polycarboxylic acid will not attain a necessary high shrinkage ratio.

The resin forming the heat-shrinkable polyester-based film of the present invention may preferably contain lubricants of fine particles to improve workability such as slipperiness of the film. Any type of fine particles may be selected, and the examples of the fine particles include inorganic fine particles such as silica, alumina, titanium dioxide, calcium carbonate, kaolin, and barium sulfate, and organic fine particles such as acrylic resin particles, melamine resin particles, silicone resin particles, and cross-linked polystyrene particles. The fine particles may desirably have an average particle diameter ranged within 0.05 to 3.0 μm measured by Coulter counter, if needed.

The fine particles may be added at any step during polyester resin production. The fine particles are added preferably in the form of a slurry dispersed in ethylene glycol during the step of esterification or after the finish of transesterification and before the start of polycondensation, and polycondensation reaction proceeds. Preferably, the fine particles are blended with the polyester resin raw materials in the form of a slurry dispersed in ethylene glycol or water with vented kneading extruder, or dried fine particles are blended with the polyester resin raw materials with kneading extruder. Control of the amount of the fine particles within a range of 300 to 1200 ppm in the film will improve both of slipperiness (friction) and transparency.

3. Method for Producing Film Roll

The heat-shrinkable polyester-based film of the present invention can be produced by supplying the polyester raw material described in "2.1. Type and amounts of polyester raw material forming film roll" to an extruder, melt-extruding the polyester raw material therefrom, and performing the following predetermined steps on an unstretched film.

In the present invention, it is an object to reduce the variation of the heat shrinkage rate in the film roll, and the object can be achieved by controlling the methods for supplying the raw material and stretching in the longitudinal direction. In the following, a production method will be described with key technologies in the present invention.

3.1. Mixing and Supplying Raw Materials

In producing the film roll of the present invention, the film needs to comprise monomers that can be amorphous component in addition to the ethylene terephthalate unit, as described above in "2. Type and amounts of polyester raw material forming film roll". In this case, two or more types of raw materials (polyester resins) are normally mixed and used. Conventionally, supply of a mixture of two or more types of raw materials into an extruder has caused variations (segregation) in the supply of the raw materials, resulting in segregation of film composition. The segregation of composition in the film roll will lead to difficulties in controlling the variation of the heat shrinkage rate within a predetermined range. The segregation of raw materials will be prevented by the following effective means; (1) optimizing the angle of repose of the polyester resin raw material; (2) optimizing the shape of a hopper in a raw material supply line; (3) installing an agitating device directly above the extruder; (4) installing Jingasa at a portion of the interior of the hopper (for cutting powder pressure); and (5) installing an inner pipe in a final hopper. The variation of the heat shrinkage rate in the film roll will be reduced preferably by adopting at least one of these means, further preferably by adopting a combination method of two or more of these means. These means will be described in detail below.

3.1. (1) Angle of Repose of Polyester Resin

During the film production, the resin in the final hopper located directly above the extruder is decreased by consumption, and the capacity or shape of the hopper may cause a phenomenon called segregation, which generates composition variation of the mixed resins supplied to an extruder. This problem prominently arises when the angles of repose of the various resins are different. As a result, the heat shrinkage rate in the film roll varies.

The angle of repose is the steepest angle between a horizontal plane and the slope of a mountain formed by a certain amount of resins dropped from a certain height. This angle of repose is determined by the shape and the particle diameter of the resin, the angle becomes smaller with an increase in resin size, and a resin with smaller angle of repose is less likely to stay (more likely to flow) in the hopper. In addition, the angle of repose also changes depending on the slipperiness of the resin surface, and the angle decreases (mountain is more likely to collapse) as the slipperiness of the resin surface increases. The resin raw material is usually produced by discharge of the melted resin in the form of strands (strings) after a polymerization step, immediate cooling in water, and cutting with a strand cutter. The shape of the resin is an elliptical column, and the volume thereof is determined by the long diameter (mm), the short diameter (mm) of a resin cross-section ellipse and a height (mm). That affects the angle of repose of the resin. The resin volume can be changed by the viscosity of the melted resin (swell at the strand die outlet), discharge speed of a strand, and the rotation speed of the strand cutter. In addition to the volume, the angle of repose is affected by the specific gravity of the resin. The specific gravity of the resin is affected by the composition of the polyester component, and the cooling rate of the melted resin. The angle of repose of the resin changes depending on conditions for producing the polyester as described above, and is usually 30 to 45 degrees.

Mixing of two or more types of raw material resins with aligned angle of repose will suppress raw material segregation in the final hopper, preferably leading to the production of a film having less composition variation. The raw material having the largest use amount is determined as a main raw material, and a raw material having an angle of repose within ±4 degrees with respect to that of the main raw material will reduce the raw material segregation. The angle of repose is more preferably within ±3 degrees.

3.1. (2) Optimization of Shape of Hopper

In addition to controlling the angle of repose of the resin raw material, optimizing the shape of the final hopper is a preferable mean due to its ability to produce a long film with a uniform composition. The inclination angle of a funnel-shaped hopper (an angle between the oblique side of the funnel shape hopper and a horizontal line) of 60 degrees or more will preferably suppress raw material segregation. The hopper with an inclination angle of less than 60 degrees has an insufficient sloping, so only the resins having a small angle of repose fall first. The inclination angle is more preferably 62 degrees or more. The inclination angle exceeding 75 degrees will undesirably limit the capacity of the hopper to very low level. The inclination angle is preferably 73 degrees or less.

3.1. (3) Installation of Agitating Device

Two or more types of resins as the raw materials preferably has an aligned angles of repose as described above in (1), however, there may be a case where the angles of repose cannot be set within ±4 degrees depending on the resins used. In this case, for eliminating raw material segregation during the step of supplying the raw materials to the extruder, an agitator can be installed at a pipe or in the hopper directly above the extruder to uniformly mix the raw materials.

3.1. (4) Installation of Jingasa

As described above in (1), the amount of the raw material in the hopper is constantly changing during the production of the film roll. Specifically, the consumption of the raw materials to the lowest level is detected by a raw material level meter installed at the hopper, and the hopper is filled with the raw materials. That is, consumption and filling of the raw material is repeated, and the powder pressure applied to a supply portion (lower portion of the hopper) directly above the extruder is constantly changing according to the amount of the raw material filling the hopper. The raw material segregation is accelerated by the variation of the powder pressure in producing a film from a mixture of two or more types of raw material resins, therefore, the powder pressure is preferably kept constant. As a means for achieving this, conventionally, a measure of shortening the raw material charging cycle (setting a minimum level of the raw material higher) has been taken. However, shortened charging cycle of the raw material requires frequent action of mechanical component for the raw material supply, leading to increased frequency of breakdowns. Therefore, in order to cut the powder pressure from an upper portion of the hopper, it is preferable to provide Jingasa, a member looks like a hat, at the lower portion of the hopper. The shape of Jingasa is not particularly limited, and is preferably a cone or a triangular pyramid. In addition, the size of Jingasa is not particularly limited, and smooth supply of the raw material requires Jingasa to have a diameter not exceeding the diameter of a pipe disposed at the lower portion of the hopper.

3.1. (5) Installation of Inner Pipe

The two or more types of raw material resins having extremely different angles of repose cause segregation of the raw materials even if the solutions described in above 3.1. (2) to (4) are taken. In this case, instead of mixed raw material in the final hopper, for example, a raw material having a different angle of repose (hereinafter, sometimes referred to as "sub-raw material") may be directly added from the inner pipe inserted to a hopper filled only with a main raw material. This preferable method can essentially avoid the segregation of raw material in the hopper. The amount of the raw material added and supplied from the inner pipe needs to match the amount of the raw material supplied in the final hopper.

Figure 1:
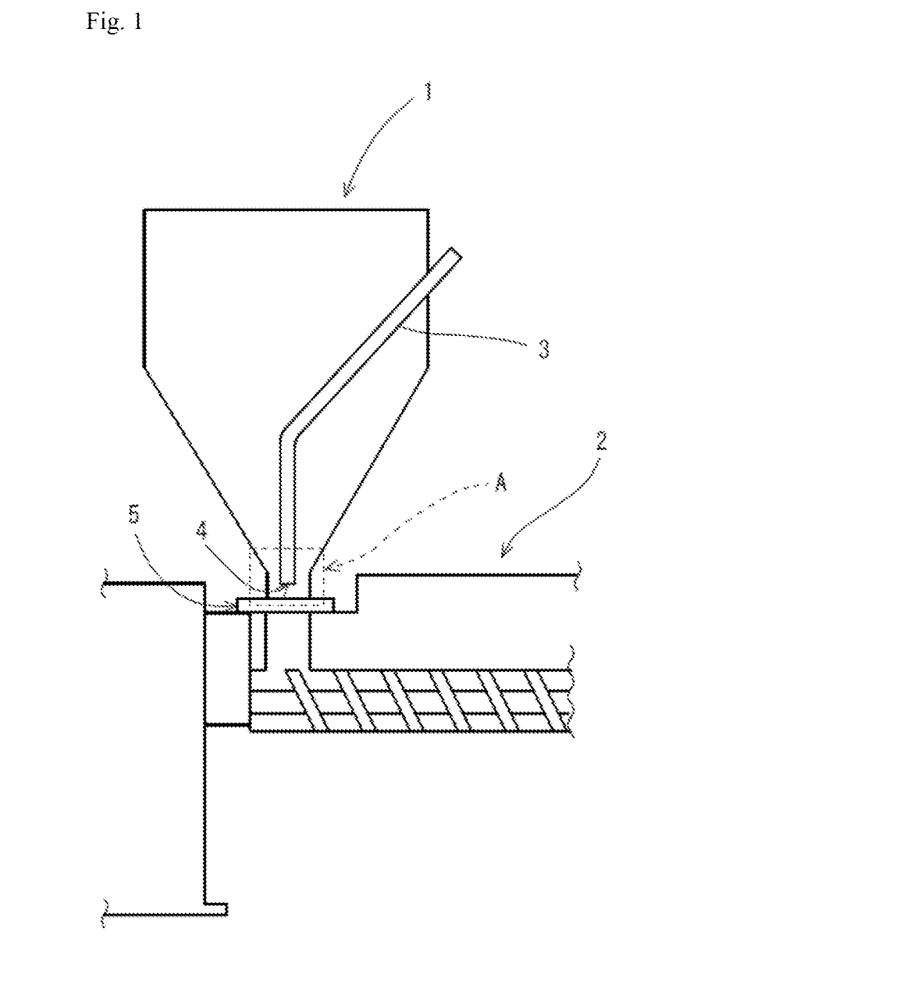
FIG. 1 is a schematic diagram illustrating an example of mixing of raw materials during a production process for the heat-shrinkable polyester-based film roll of the present invention.
Figure 2:
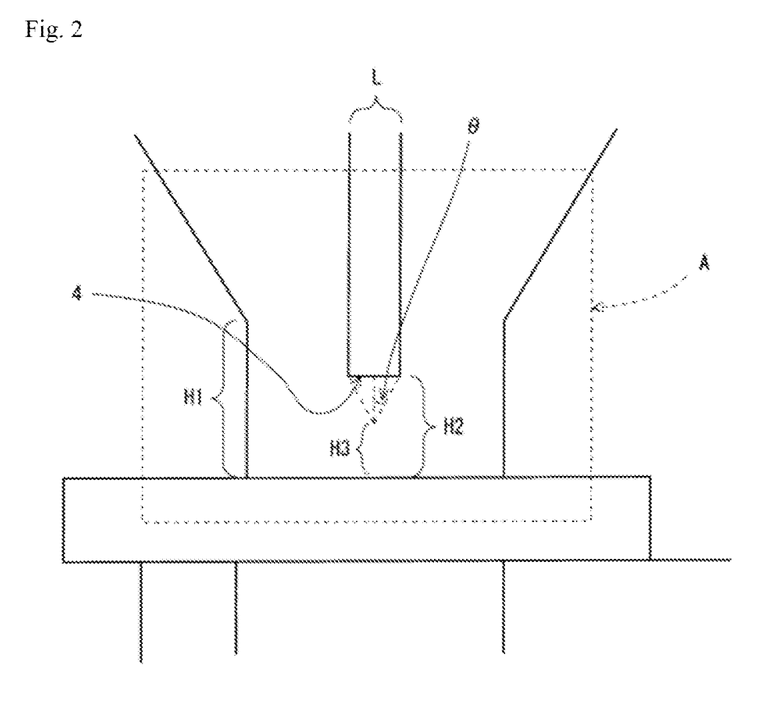
FIG. 2 is a partially enlarged view of FIG. 1.

An example of a specific mixing procedure is shown in FIG. 1. FIG. 1 is a schematic view illustrating an exemplary relationship between an extruder 2 provided with a hopper 1 and an inner pipe 3. FIG. 2 is an enlarged view of a portion A in FIG. 1. As shown in FIGS. 1 and 2, main raw materials are supplied from the upper part of the hopper 1, and sub-raw materials are supplied through the inner pipe 3. Since an outlet 4 of the inner pipe 3 is located right and immediately above the extruder (precisely, right and immediately above a resin supply port 5 of the extruder 2), the mixing ratio of the raw materials can be kept constant.

A height (H2) of the outlet 4 of the inner pipe 3 preferably satisfies the following Equation 1, and more preferably satisfies of both Equations 1 and 2.

$$H2 < H1 \qquad \text{(Equation 1)}$$

wherein H1 indicates a height of a part where the inner wall of the hopper is vertical (see FIG. 2).

$$0.5 \times L/\tan\theta < H2 \qquad \text{(Equation 2)}$$

wherein L is an inner diameter of the outlet 4 of the inner pipe 3 (see FIG. 2), and θ is an angle of repose of the other resin chip.

By setting the height of H2 to more than 0.5×L/tan θ, the position for mixing the sub-raw materials with the main raw materials (H3, see FIG. 2) can be disposed at the exterior of the extruder, enabling the prevention of air bubbles formed by the air introduced to the extruder.

The height H3 (=H2−0.5×L/tan θ) of the mixing position of the sub-raw materials is preferably higher than 0 m and less than 2 m. The height H3 of higher than 0 m will prevent the entry of air into the extruder, and the height H3 of less than 2 m will keep the distance to the extruder short, enabling to prevent raw materials from segregating. The height H3 is preferably 0.3 m or higher and 1.7 m or less, and further preferably 0.6 m or higher and 1.4 m or less.

As a weighing apparatus, a known device such as a table feeder can be used. Instead of only one inner pipe, two or more inner pipes may be inserted in the hopper. Multiple types of raw materials may be added from one inner pipe. However, one type of raw material is preferably supplied from one inner pipe for accurate supply of the raw materials.

The polyester can be produced by polycondensation of the suitable dicarboxylic acid component and diol component in a known manner. In addition, before the resin raw materials are sent to the final hopper, the resins are preferably dried with dryers such as a hopper dryer or a paddle dryer, or a vacuum drying machine.

3.2. Melt Extrusion

The above mixed raw material is extruded into a film at a temperature of 200 to 280° C. with an extruder. Any known extrusion method such as a T-die method and a tubular method may be adopted. The extrusion temperature exceeding 280° C. lowers the intrinsic viscosity of the polyester resin and thus causes breakage during a film forming process, undesirably leading to difficulties in producing a film in a steady state. In case where the film is provided with a plurality of layers, a plurality of extruders, feed blocks, or a multi-manifold may be used.

Then, the melt-extruded film can be rapidly cooled to obtain an unstretched film. As a method for rapid cooling of the melted resin, a method in which the melted resin is cast from a die onto a rotating drum and rapidly cooled to be solidified to obtain a substantially un-oriented resin sheet can be suitably adopted.

Furthermore, the shear rate of discharging the melted resin from the opening of the die is preferably 100 sec$^{-1}$ or more and more preferably 150 sec$^{-1}$ or more. A higher shear rate will suppress variation of the shrinkage rate in the longitudinal direction of the film. This is because the resin discharge pressure at the die opening (outlet) becomes more stable with the increase in the shear rate. The shear rate of less than 100 sec$^{-1}$ causes unstable resin discharge pressure at the die's outlet and thus causes pulsation (variation of the thickness of the unstretched film in the longitudinal direction), leading to increased variation of the heat shrinkage rate in the longitudinal direction due to non-uniform longitudinal stretching described later.

The shear rate of more than 600 sec$^{-1}$ undesirably not only decreases the intrinsic viscosity due to breakage or decomposition of the polyester molecular chains, but also impairs productivity due to resin dregs adhering to the discharge portion of the die.

The shear rate at the die's outlet is calculated according to the following Equation 3.

$$Y = 6Q/(W \times H2) \qquad \text{(Equation 3)}$$

Y: shear rate (sec$^{-1}$)
Q: amount of raw material discharged from extruder (cm$^3$/sec)
W: width of die's opening (cm)
H: interval of die's opening (lip gap) (cm)

The film may be formed by any method such as non-stretching, uniaxial stretching (i.e., stretching in the longitudinal direction), and biaxial stretching. From the viewpoint of mechanical strength and productivity, uniaxial stretching is preferable, and biaxial stretching is more preferable. The following is the description focusing on a sequential biaxial stretching method, which is transverse stretching-transverse stretching comprising first stretching in the width direction (referred to as "transverse stretching" in some cases) and next stretching in the longitudinal direction (referred to as "longitudinal stretching" in some cases). However, the stretching may be a reverse order of transverse stretching-longitudinal stretching, or may be a simultaneous biaxial stretching comprising a simultaneous stretching in the longitudinal and the transverse directions.

3.3. Stretching in Width Direction (Transverse Stretching)

First, stretching is performed in the width (transverse) direction. The stretching in the transverse direction is preferably performed at 65° C. to 100° C. by about 2.5 to 5 times in a tenter (first tenter) with both ends in the width direction of the film held by clips. Preferably, preheating is performed before the transverse stretching, and the preheating may be performed until the film surface temperature reaches 60° C. to 95° C. After the transverse stretching, the film preferably passes through an intermediate zone where no active heating operation is performed on the film. In case where a transverse stretching zone of the first tenter and an intermediate heat treatment zone have a temperature difference, heat (hot air itself or radiant heat) in the intermediate heat treatment zone may flow into the transverse stretching step, leading to unstable film quality due to unstable temperature in the transverse stretching. Therefore, the film after transverse stretch but before intermediate heat treatment preferably passes through the intermediate zone over a predetermined time, and then the film is subjected to the intermediate heat treatment. For stable quality of the film, in the intermediate heat treatment zone, the accompanying flow from running of the film and the hot air from the transverse stretching zone and the intermediate heat treatment zone are blocked such that a strip of paper almost completely vertically hangs down in a state where the film is not passed through the intermediate zone. The time for passing through the intermediate zone of about 1 second to 5 seconds is enough. The passing time of less than 1 second leads to insufficient length of the intermediate zone and thus causes insufficient heat blocking effect. In addition, the intermediate zone is preferably longer, but excessively long intermediate zone requires large facility. The passing time of about 5 seconds is enough.

3. 4. Intermediate Heat Treatment

After passing through the intermediate zone, intermediate heat treatment is performed before longitudinal stretching. The intermediate heat treatment is performed in order to adjust the shrinkage rate in the width direction. As the temperature of the intermediate heat treatment after the transverse stretching is increased, the heat shrinkage rate in the width direction will decrease. The temperature of the intermediate heat treatment is preferably 60 to 140° C. The temperature of the intermediate heat treatment zone of lower than 60° C. will not affect to bring changes in the heat shrinkage rate in the width direction after the transverse stretching. The temperature of the intermediate heat treatment zone of higher than 140° C. will decrease the heat shrinkage rate in the width direction and subsequent stretching in the longitudinal direction will be prevented by crystallization. The time for passing through the intermediate heat treatment zone is preferably 2 seconds to 20 seconds. The passing time of less than 2 seconds will lead to insufficient length of the intermediate heat treatment zone, resulting in difficulties in controlling the heat shrinkage rate in the transverse direction. The intermediate heat treatment zone is preferably longer, but the passing time of about 20 seconds is enough. Accordingly, a transversely and uniaxially stretched film is produced.

During the intermediate heat treatment, the film is relaxed by decreasing the distance between the clips at any rate in the film width direction in the first tenter (i.e., relaxation). The treatment relaxes the molecular chains oriented in the width direction without crystallization, leading to decreased shrinkage rate in the width direction. The relaxation after transverse stretching is preferably performed by 3% or more. The upper limit of the relaxation rate after the transverse stretching is determined depending on the raw material, the stretching conditions in the width direction, and the heat treatment temperature. The relaxation cannot be performed at a rate exceeding the upper limit.

3.5. Stretching in Longitudinal Direction (Longitudinal Stretching)

Subsequently, longitudinal stretching is performed. In the longitudinal stretching step, the film from the previous step is guided to a longitudinal stretching machine having a plurality of roll groups continuously arranged. Before the longitudinal stretching, the film is preferably preheated with a preheating roll until the film temperature reaches 65° C. to 120° C. The film temperature of lower than 65° C. leads to difficulties in stretching of the film in the longitudinal direction by breakage. The film temperature of higher than 120° C. leads to sticking of the film to the roll and thus causes early onset of stains in continuous production.

When the film temperature reaches the above range, the longitudinal stretching is performed. The longitudinal stretching is performed on the basis of the speed difference of the rolls. The stretch ratio is preferably 1.5 to 5. The longitudinal stretching may be one-stage stretching involving two types of rolls such as low speed rolls and high speed rolls, and the number of stretching stage may be increased to two-stage stretching involving three types of rolls such as low speed rolls, medium speed rolls, and high speed rolls, or three-stage stretching involving four types of rolls such as low speed rolls, medium-low speed, medium speed rolls, and high speed rolls.

The stretching rate is preferably controlled to be, for example, in the range of 100%/sec or more and 10000%/sec or less. Excessively high stretching rate will lead to insufficient heating of the film, and excessively low stretching rate will lead to decreased productivity. The stretching rate is more preferably 200%/sec or more and 9900%/sec or less, and further preferably 300%/sec or more and 9800%/sec or less. The stretching rate can be calculated according to the following Equation 4.

$$\text{Stretching rate} = \lambda / T \quad \text{(Equation 4)}$$

λ: stretching strain (%)
T: time required for stretching (sec)

Examples of the heating roll include a heating roll made of a metal material with hard chromium plating on the surface thereof (hereinafter, referred to as "chromium-plated roll"); a heating roll made of a ceramics-based material (hereinafter, referred to as "ceramics roll"); a heating roll made of a fluorine resin-based material (hereinafter, referred to as "fluorine resin roll"); a heating roll made of a silicone rubber material (hereinafter, referred to as "silicone rubber roll"). The chromium-plated roll and the ceramics roll are preferable for preheating, and the fluorine resin roll and the silicone rubber roll are preferable for heating to a predetermined temperature after preheating. The chromium-plated roll and the ceramics roll have relatively smooth surfaces in terms of surface roughness and thus can transfer heat to the film well due to high adhesiveness to the film, leading to efficient preheating of the film. The surface roughness of the roll is evaluated by average roughness (SRa), a maximum projection height (SRmax), and ten-point average roughness (SRz), which are measured, for example, by a small surface roughness meter (Surftest SJ-301, manufactured by Mitutoyo Corporation). The chromium-plated roll has SRz of preferably 0.01 or more and 0.05 or less, and more preferably 0.02 or more and 0.04 or less. The ceramics roll has SRmax of preferably 1 or more and 8 or less, and more preferably 1.5 or more and 7.5 or less. The fluorine resin roll and the silicone rubber roll have high separability due to their rough surfaces, and the high separability is kept even if the film softened by heating becomes sticky. The fluorine resin roll has SRz of preferably 0.1 or more and 2 or less, and more preferably 0.2 or more and 1.9 or less. The silicone rubber roll has SRz of preferably 2 or more and 12 or less, and more preferably 3 or more and 11 or less. For example, preferably, the film is preheated with preheating rolls of chromium-plated rolls and/or fluorine resin rolls, after that, the film is heated to a predetermined temperature with one or a plurality of main heating rolls of ceramics rolls and/or silicone rubber rolls. The preheating rolls may be a free-rotating type or a driven type. The main heating rolls are normally a driven type. The film thus heated to a predetermined temperature can be longitudinally stretched by the speed difference between the main heating rolls and stretching rolls disposed downstream of the main heating rolls.

3.6. Final Heat Treatment

The film after the longitudinal stretching and cooling is guided to a second tenter for final heat treatment, where heat treatment and relaxation treatment are conducted. The final heat treatment step is preferable in that the shrinkage rates in the longitudinal and transverse directions are controlled. The shrinkage rate in the longitudinal direction is not much changed by relaxation in the second tenter, but the shrinkage rate in the transverse direction is decreased. The relaxation rate is preferably 0% to 50%. The lower limit of the relaxation rate is 0%. High relaxation rate disadvantageously leads to shortened width of the film product. The upper limit of the relaxation rate is preferably about 50%.

The heat treatment (relaxation treatment) temperature is preferably 65° C. to 120° C. The heat treatment temperature of lower than 65° C. does not change the shrinkage rate of the film. The heat treatment temperature of higher than 120° C. crystallizes the film, leading to a film unable to shrink in both the longitudinal and the transverse directions, which is not preferable as a heat-shrinkable film.

The variation range of the surface temperature of the film is measured at any point in each step including preheating and stretching step in the transverse stretching, the intermediate heat treatment step, the preheating, stretching, and cooling steps in the longitudinal stretching, and the final heat treatment step. The variation range of the surface temperature is controlled to preferably within a range of an average temperature±1° C., and more preferably within a range of the average temperature±0.5° C., from the viewpoint of reducing the variation of the heat shrinkage rate. The variation range of the surface temperature of the film is determined through continuous measurement of the film surface at any point above mentioned, for example, by an infrared type non-contact surface temperature meter during the production of the film.

3.7. Winding

The heat-shrinkable polyester-based film roll of the present invention is preferably a film roll produced by winding a heat-shrinkable film having a width of 300 mm or more and 2500 mm or less on a winding core by a length of 1000 m or more and 20000 m or less. In general, a wide master roll is prepared, and a film roll product is produced by slitting the master roll at an optional width while being wound into a roll having an optional width and winding length. A roll of a film having a width of less than 300 mm or a length of less than 1000 m has low industrial application value. The width of the heat-shrinkable film roll is more preferably 350 mm or more, and further preferably 400 mm or more. The width of the heat-shrinkable film roll exceeding 2500 mm often causes a paper tube to be bent during winding, disadvantageously leading to winding defects of a film roll such as wrinkles. The width of the heat-shrinkable polyester-based film roll is more preferably 2450 mm or less, and further preferably 2400 mm or less. The winding length of the heat-shrinkable film to be wound into a roll is more preferably 400 m or more, and further preferably 500 m or more. The heat-shrinkable film roll having longer winding length is preferable due to its ability to reduce the number of times required to replace the rolls during the formation of an annular body, leading to improved productivity. In the present invention, the winding length up to 20000 m is confirmed, therefore, the length was determined as the upper limit.

The winding core is not particularly limited, and a known one may be used. Examples of the winding cores include paper tubes, plastic cores, or metal cores of 3 inches, 6 inches, 8 inches, respectively.

EXAMPLES

The present invention will be specifically described with Examples and Comparative Examples. However, the present invention should not be limited to the embodiments of the Examples, and can be appropriately modified within the scope not departing from the gist of the present invention.

[Sampling Method]

The film rolls produced in Examples and Comparative Examples and each having a length of 1000 m were provided with the sample cutout portion provided every 100 m from the first sample cutout portion at the center position in the roll width direction corresponding to the second end portion (0 m from a surface layer portion). The final sample cutout portion was corresponding to the first end portion of the film (0 m from the winding core), and samples were collected from totally 11 sample cutout portions. Ten samples were cut out from each sample cutout portion, and the average values of the physical properties of the ten samples were determined as the physical property values of the sample cutout portion.

[Heat Shrinkage Rate (Heat Shrinkage Rate in Hot Water)]

The polyester-based film was cut into a square of 100 mm×100 mm. After immersion in hot water of 90° C.±0.5° C. for 10 seconds in a no-load state to be heat-shrunk, the film was immersed in water of 25° C.±0.5° C. for 10 seconds, and was pulled out from the water. The dimensions of the film in the longitudinal and the width directions were measured, and the heat shrinkage rate in each direction was calculated according to the following Equation 3. The direction having higher heat shrinkage rate was determined as the main shrinkage direction (longitudinal direction). In addition, the variations (average values, maximum values, and minimum values) of the heat shrinkage rates in the longitudinal direction and the width direction in all samples were examined.

$$\text{Heat shrinkage rate (\%)} = \{(L0-L1)/L0\} \times 100 \quad \text{(Equation 5)}$$

L0: film length before heat shrinkage (100 mm)
L1: film length after heat shrinkage

[Component Composition]

Sample solution was prepared by dissolving each sample in a mixed solvent of chloroform D (manufactured by Eurisotop) and trifluoroacetic acid D1 (manufactured by Eurisotop) at a ratio of 10:1 (by volume). Proton NMR of the sample solution was measured with NMR (GEMINI-200, manufactured by Varian Medical Systems, Inc.) at 23° C. with integration times of 64. In the NMR measurement, the peak intensities of predetermined protons were calculated, and the amounts of the components in 100 mol % of a polyhydric alcohol component were measured. In Examples and Comparative Examples, the most abundant alcohol component was ethylene glycol. Among the components other than ethylene glycol, the content variations in all samples (average values, maximum values, minimum values) of the alcohol component contained in the largest amount (the most abundant component) and the alcohol component contained in the next largest amount (second most abundant component) were examined.

[Intrinsic Viscosity (IV)]

Polyester (0.2 g) was dissolved in mixed solvent (50 mL) of phenol/1,2,2-tetrachloroethane (60/40, weight ratio), and the intrinsic viscosity (dL/g) was measured in a water bath of 30° C. with an Ostwald viscometer.

[Evaluation of Shrinkage Finishing Property (Wrap-Around)]

The film with a width of 50 mm was wrapped around a plastic lunchbox container (sides: 150 mm×150 mm, height: 100 mm) in the direction where the shrinkage direction of the film corresponds to the circumferential direction of the container, so as to fix the body and the lid of the container.

The film was melt-cut and sealed at 220° C. with an impulse sealer, and was heat-shrunk to the plastic lunchbox container in a shrink tunnel at a set temperature of 90° C. The shrinkage finishing property was evaluated in defects of wrinkles, sink mark, insufficient shrinkage, and looseness of the film, depending on the five levels described below. The wrinkles having a length of 5 cm or more in the side direction of the lunchbox container in FIG. 3 were counted. For sink mark, in FIG. 4 (a top view of the lunchbox container and the banding film after shrinkage), the length from an end of the film at one side to an end of the film at another side was denoted by L, and the difference between a maximum value Lmax and a minimum value Lmin when the length L was measured at every 5 mm in the circumferential direction of the lunchbox container was denoted by R. The difference R of more than 10 mm was counted as sink mark. The film after shrinkage finishing was visually evaluated for shrinkage insufficiency. The banding film not completely adhered to the lunchbox container after shrinkage, not tight when touched by hand, and partially separated from the lunchbox container was determined as being loose.

5: best finishing property (no defects)
  4: good finishing property (one defect)
  3: two defects
  2: three to five defects
  1: many defects (six defects or more)

Level 4 or higher was regarded as an acceptable level, Level 3 or lower was regarded as defective, and a shrinkage finish defect rate (%) was calculated according to the following Equation 6.

Shrinkage finish defect rate=100×(number of defective samples)/(total number of samples)   (Equation 6)

<Synthesis of Polyester Raw Material>
Synthesis of Polyester Raw Material A

In a stainless steel autoclave equipped with an agitator, a thermometer, and a partial circulation type cooler, 100 mol % of dimethyl terephthalate (DMT) as a dicarboxylic acid component and 100 mol % of ethylene glycol (EG) as a polyhydric alcohol component were charged such that the mole ratio of ethylene glycol to dimethyl terephthalate was 2.2 times. Zinc acetate was added as an ester exchange catalyst at a ratio of 0.05 mol % to the acid component, antimony trioxide was added as a polycondensation catalyst at a ratio of 0.225 mol % to the acid component, and an ester exchange reaction was carried out while methanol byproduct being distilled out of the system. Then, a polycondensation reaction was carried out at 280° C. under a reduced pressure of 26.7 Pa. The obtained polyester was taken out from the polymerization apparatus in a melted state in the form of strands, immediately cooled in water, and then cut with a strand cutter to produce a polyester raw material A. The intrinsic viscosity of the polyester raw material A was 0.70 dL/g. The intrinsic viscosity (dL/g) was measured with an Ostwald viscometer at 30° C. with the polyester (0.2 g) dissolved in a mixed solvent (50 mL) of phenol/1,1,2,2-tetrachloroethane (60/40, weight ratio). The polyester raw material A is polyethylene terephthalate. The composition of the monomer components of the polyester raw material A is shown in Table 1. In Table 1, the content of each monomer component in 100 mol % of the total acid component is shown in the cell for "Acid component", and the content of each monomer component in 100 mol % of the total polyhydric alcohol component is shown in the cell for "Polyhydric alcohol component".

The average resin size of the polyester A was calculated from 100 resins. Assuming that the resin shape was a circular column, the long diameter and the short diameter of an elliptical cross-section, and a height (cut length) were measured by calipers. The polyester A had a long diameter of 3.7 mm, a short diameter of 2.6 mm, a height of 3.7 mm, and a volume of 28 mm³.

Synthesis of Polyester Raw Materials B to F

Polyester raw materials B to F comprising different monomer components as shown in Table 1 were produced in the same manner as polyester raw material A. The polyester raw material B was produced by adding $SiO_2$ (SYLYSIA 266, manufactured by FUJI SILYSIA CHEMICAL LTD., average particle diameter: 1.5 μm) as a lubricant at a ratio of 7,000 ppm to the polyester. Each polyester raw material was made into the form of chips as appropriate. The resin shape of the polyester F was reduced by increasing the rotation speed of the strand cutter. In Table 1, TPA indicates terephthalic acid, EG indicates ethylene glycol, NPG indicates neopentyl glycol, CHDM indicates 1,4-cyclohexanedimethanol, BD indicates 1,4-butanediol, and DEG indicates diethylene glycol byproduct. The intrinsic viscosity of each polyester raw material was B: 0.70 dL/g, C: 0.75 dL/g, D: 0.74 dL/g, E: 1.20 dL/g, and F: 1.20 dL/g. The properties of each polyester raw material are shown in Table 1.

TABLE 1

| Polyester raw material | | | A | B | C | D | E | F |
|---|---|---|---|---|---|---|---|---|
| Polyester raw material composition (mol %) | Acid component | TPA | 100 | 100 | 100 | 100 | 100 | 100 |
| | Polyhydric alcohol component | EG | 99 | 99 | 68 | 68 | — | — |
| | | NPG | — | — | 30 | — | — | — |
| | | CHDM | — | — | — | 30 | — | — |
| | | BD | — | — | — | — | 100 | 100 |
| | | DEG | 1 | 1 | 2 | 2 | — | — |
| Amount of lubricant (ppm) | | | — | 7000 | — | — | — | — |
| Intrinsic viscosity (dL/g) | | | 0.70 | 0.70 | 0.75 | 0.74 | 1.20 | 1.20 |
| Resin shape | Long diameter (mm) | | 3.7 | 3.6 | 3.5 | 3.5 | 3.3 | 3.3 |
| | Short diameter (mm) | | 2.6 | 2.6 | 2.7 | 2.6 | 2.4 | 2.4 |
| | Height (mm) | | 3.7 | 3.8 | 3.9 | 3.8 | 2.8 | 2.3 |
| | Volume (mm³) | | 28.0 | 27.9 | 28.9 | 27.2 | 17.4 | 14.3 |
| Specific gravity (g/cm³) | | | 1.34 | 1.38 | 1.30 | 1.29 | 1.31 | 1.31 |
| Angle of repose (°) | | | 39 | 40 | 40 | 40 | 37 | 33 |

The polyester raw materials A to F were used to produce each of the polyester films described in Table 2.

Example 1

Figure 3:
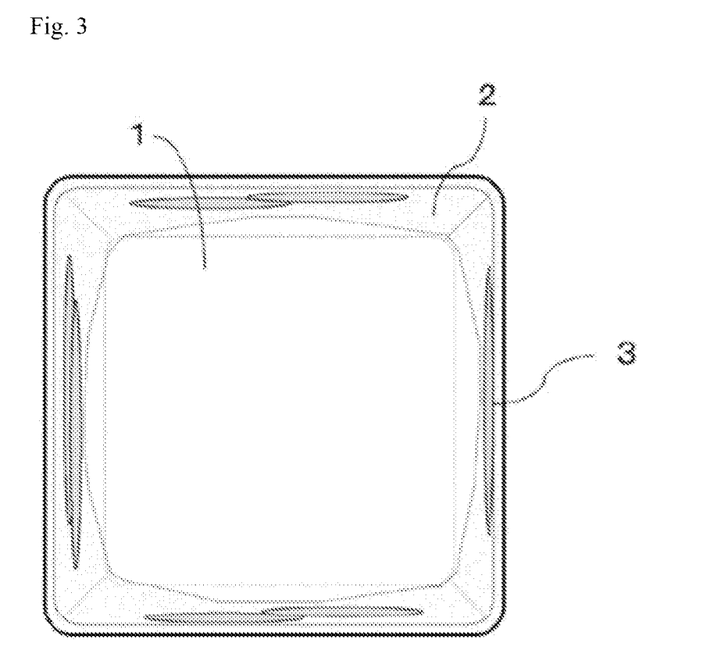
FIG. 3 is a schematic diagram of a plastic lunchbox container for evaluating wrinkles of a film after shrinkage.
Figure 4:
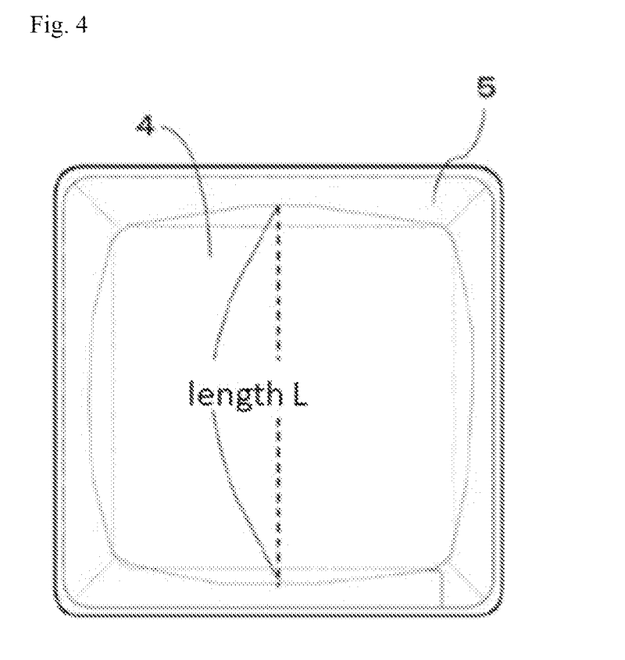
FIG. 4 is a schematic diagram of a plastic lunchbox container for evaluating sink mark of a film after shrinkage.

The polyesters B, C, and E were mixed at a mass ratio of 10:66:24, and introduced into an extruder by supplying from a hopper installed directly above the extruder. Jingasa and an agitating device were installed in the extruder as shown in FIG. 3. The mixed resin was melted at 280° C., extruded from a T-die at a shear rate of 120 sec$^{-1}$, and wound and rapidly cooled on a rotating metal roll cooled to a surface temperature of 30° C., to produce an unstretched film.

The unstretched film was guided to a transverse stretching machine (tenter) and preheated at 80° C. for 5 seconds. The preheated film was continuously guided to a transverse stretching zone, and transversely stretched at 77° C. by 3.8 times. The transversely stretched film was continuously guided to an intermediate heat treatment zone and heated at 107° C. for 8 seconds.

Then, the film was guided to a longitudinal stretching machine in which roll groups each including low-speed rolls consisting of a chromium-plated roll and a ceramics roll and high-speed rolls consisting of a fluorine resin roll and a silicone rubber roll were continuously arranged, and the film was preheated on a preheating roll until the film temperature reached 95° C., and was then stretched 2.0 times in the longitudinal direction at 90° C. At this time, the stretching rate was 130%/sec. After the stretching, the longitudinally stretched film was cooled on a cooling roll having a surface temperature set at 25° C.

Then, the cooled film was guided to a tenter (second tenter), heat-treated in an atmosphere of 92° C. over a period of 10 seconds in the second tenter, and relaxed by 2% in the transverse direction (film width direction). Then, the film was cooled, and both edge portions thereof were cut and removed, to produce a heat-shrinkable polyester-based film having a thickness of about 30 μm. Finally, the film was heat-treated at 50° C. for 3 seconds in a heat treatment zone, and cooled, and both edge portions thereof were cut and removed, to continuously form a film over a length of 4000 m or more.

In this case, the variation range of the surface temperature of the film was within a range of an average temperature±0.5° C. in any of the preheating step and the stretching step in transverse stretching, the intermediate heat treatment step, the preheating step, the stretching step, and the cooling step in the longitudinal stretching step, and the final heat treatment step.

The film was slit at a width of 900 mm and a length of 4000 m and wound on a 3-inch paper tube into a roll to produce a film of Example 1.

Examples 2 to 4

In Examples 2 to 4, film rolls were produced under the conditions shown in Table 2, which is changed from those of Example 1.

In Examples 3 and 4, transverse stretching and intermediate heat treatment were not performed, and only longitudinal stretching was performed.

In Example 4, the polyesters A, B, and C were mixed at a ratio of 20:8:53 to the total weight and supplied to a raw material supply hopper. An inner pipe shown in FIG. 1 was further provided in the raw material supply hopper, and only the polyester F was directly supplied to the extruder so as to make up 19% of the total weight (the polyester composition by mass ratio is A:B:C:F=20:8:53:19).

Comparative Examples 1 to 4

In Comparative Examples 1 to 4, film rolls were produced under the conditions shown in Table 2, which is changed from those of Example 1.

The properties of each film thus produced were evaluated by the methods described above. These results are shown together in Table 2.

TABLE 2

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Film raw material composition (mass %) | | Polyester A | 0 | 20 | 20 | 20 | 0 | 20 | 20 | 45 |
| | | Polyester B | 10 | 10 | 8 | 8 | 10 | 10 | 8 | 5 |
| | | Polyester C | 66 | 0 | 53 | 53 | 66 | 0 | 53 | 50 |
| | | Polyester D | 0 | 60 | 0 | 0 | 0 | 60 | 0 | 0 |
| | | Polyester E | 24 | 10 | 19 | 0 | 24 | 10 | 0 | 0 |
| | | Polyester F | 0 | 0 | 0 | 19 | 0 | 0 | 19 | 0 |
| Raw material supply | Final hopper | Agitating device | Use | Use | Use | Use | Use | Unused | Use | Use |
| | | Jingasa | Use | Use | Use | Use | Use | Unused | Use | Use |
| | | Inner pipe | Unused | Unused | Unused | Use | Unused | Unused | Unused | Unused |
| | Polyhydric alcohol component (mol %) | EG | 55 | 71 | 64 | 64 | 55 | 71 | 64 | 84 |
| | | NPG | 20 | 0 | 16 | 16 | 20 | 0 | 16 | 15 |
| | | CHDM | 0 | 18 | 0 | 0 | 0 | 18 | 0 | 0 |
| | | BD | 24 | 10 | 19 | 19 | 24 | 10 | 19 | 0 |
| | | DEG | 1 | 1 | 1 | 1 | 1 | 1 | 1 | 1 |
| Extrusion | | Shear rate (/sec) | 120 | 250 | 250 | 400 | 120 | 250 | 250 | 80 |
| Transverse stretching | Preheating | Temperature (° C.) | 80 | 90 | — | — | 80 | 90 | — | — |
| | Stretching | Temperature (° C.) | 77 | 84 | — | — | 77 | 84 | — | — |
| | | Stretching ratio | 3.8 | 3.8 | — | — | 3.8 | 3.8 | — | — |
| | Intermediate heat treatment | Temperature (° C.) | 107 | 117 | — | — | 107 | 117 | — | — |
| | | Relaxation rate (%) | 14 | 6 | — | — | 14 | 6 | — | — |
| Longitudinal stretching | Preheating | Temperature (° C.) | 95 | 105 | 95 | 105 | 95 | 105 | 105 | 85 |
| | | Material of rolls | Chromium | Ceramics | Ceramics | Ceramics | Chromium | Ceramics | Ceramics | Ceramics |
| | Stretching | Temperature (° C.) | 90 | 95 | 90 | 95 | 90 | 95 | 95 | 80 |
| | | Stretching ratio | 2.0 | 2.4 | 4.5 | 4.1 | 2.0 | 2.4 | 4.1 | 3.5 |
| | | Stretching rate (%/sec) | 130 | 460 | 1870 | 370 | 130 | 460 | 370 | 85 |
| | | Material of rolls | Silicone | Silicone | Silicone | Silicone | Chromium | Silicone | Silicone | Silicone |
| | Final heat treatment | Temperature (° C.) | 92 | 85 | 90 | — | 92 | 85 | — | — |
| | | Relaxation rate (%) | 2 | 12 | — | — | 2 | 12 | — | — |
| | Film roll | Thickness (μm) | 30 | 13 | 13 | 30 | 30 | 13 | 30 | 12 |
| | | Width (mm) | 900 | 900 | 900 | 1200 | 900 | 900 | 1200 | 900 |
| | | Winding length (m) | 4000 | 12000 | 20000 | 12000 | 4000 | 12000 | 12000 | 4000 |

TABLE 3

| | | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|---|
| Composition | Amount of amorphous component in polyhydric alcohol component (mol %) | Most abundant component | Average value (a) | 24.3 | 18.5 | 18.7 | 19.2 | 24.1 | 18.9 | 18.5 | 14.8 |
| | | | Maximum value (b) | 24.9 | 19.3 | 19.2 | 20.8 | 24.9 | 23.1 | 23.6 | 16.9 |
| | | | Minimum value (c) | 23.3 | 17.8 | 18.1 | 17.4 | 23.5 | 14.8 | 13.1 | 12.5 |
| | | | (b) − (a) | 0.6 | 0.8 | 0.5 | 1.6 | 0.8 | 4.2 | 5.1 | 2.1 |
| | | | (a) − (c) | 1.0 | 0.7 | 0.6 | 1.8 | 0.6 | 4.1 | 5.4 | 2.3 |
| | | Second most abundant component | Average value (a) | 19.6 | 10.1 | 15.9 | 16.3 | 20.1 | 9.4 | 16.8 | 0.8 |
| | | | Maximum value (b) | 20.4 | 10.5 | 16.6 | 17.4 | 21.2 | 15.3 | 21.7 | 1.3 |
| | | | Minimum value (c) | 19.0 | 9.5 | 15.4 | 15.1 | 19.1 | 4.5 | 11.1 | 0.6 |
| | | | (b) − (a) | 0.8 | 0.4 | 0.7 | 1.1 | 1.1 | 5.9 | 4.9 | 0.5 |
| | | | (a) − (c) | 0.6 | 0.6 | 0.5 | 1.2 | 1.0 | 4.9 | 5.7 | 0.2 |
| | Intrinsic viscosity (IV)(dL/g) | | | 0.68 | 0.66 | 0.66 | 0.59 | 0.68 | 0.66 | 0.66 | 0.65 |
| Heat shrinkage rate in hot water (90° C.) (%) | Longitudinal direction | | Average value (a) | 48.4 | 56.1 | 55.5 | 71.3 | 47.1 | 57.3 | 70.5 | 50.4 |
| | | | Maximum value (b) | 49.3 | 56.2 | 56.1 | 72.2 | 53.2 | 62.2 | 74.1 | 54.5 |
| | | | Minimum value (c) | 47.5 | 55.7 | 54.8 | 70.5 | 41.8 | 52.1 | 67.4 | 46.8 |
| | | | (b) − (a) | 0.9 | 0.1 | 0.6 | 0.9 | 6.1 | 4.9 | 3.6 | 4.1 |
| | | | (a) − (c) | 0.9 | 0.4 | 0.7 | 0.8 | 5.3 | 5.2 | 3.1 | 3.6 |
| | Width direction | | Average value (a) | 15.8 | 7.9 | 3.9 | 1.4 | 15.2 | 7.1 | 1.8 | 6.4 |
| | | | Maximum value (b) | 16.7 | 8.8 | 4.1 | 2.5 | 19.8 | 13.2 | 5.4 | 9.5 |
| | | | Minimum value (c) | 14.3 | 7.3 | 3.4 | 0.3 | 12.1 | 2.3 | −2.7 | 3.6 |
| | | | (b) − (a) | 0.9 | 0.9 | 0.2 | 1.1 | 4.6 | 6.1 | 3.6 | 3.1 |
| | | | (a) − (c) | 1.5 | 0.6 | 0.5 | 1.1 | 3.1 | 4.8 | 4.5 | 2.8 |
| Refractive index | Nx (Degree of orientation in longitudinal direction) | | Average value (a) | 1.5885 | 1.5979 | 1.6366 | 1.6354 | 1.5813 | 1.5983 | 1.6377 | 1.6174 |
| | | | Maximum value (b) | 1.5936 | 1.6012 | 1.6415 | 1.6431 | 1.6012 | 1.6131 | 1.6523 | 1.6345 |
| | | | Minimum value (c) | 1.5811 | 1.5922 | 1.6323 | 1.6289 | 1.5668 | 1.5821 | 1.6248 | 1.6011 |
| | | | (b) − (a) | 0.0051 | 0.0033 | 0.0049 | 0.0077 | 0.0199 | 0.0148 | 0.0146 | 0.0171 |
| | | | (a) − (c) | 0.0074 | 0.0057 | 0.0043 | 0.0065 | 0.0145 | 0.0162 | 0.0129 | 0.0163 |
| Evaluation of shrinkage finishing property | | | Defect rate (%) | 1.3 | 0.0 | 1.2 | 0.5 | 12.5 | 10.3 | 8.4 | 10.8 |

The heat-shrinkable films of Examples 1 to 4 satisfying the requirements of the present invention have variation of the heat shrinkage rate in the film roll of within the specified range, which were satisfactory.

In Comparative Example 1, compared to these Examples, chromium-plated rolls for longitudinal stretching led to sticking of the film to the rolls and thus caused non-uniform stretching, resulting in the variation of the heat shrinkage rate exceeding the specified range.

In Comparative Example 2, the raw material supply step without an agitating device, Jingasa, and an inner pipe led to increased variation of the composition in the film roll, resulting in increased variation of the heat shrinkage rate.

In Comparative Example 3, the polyester H having an extremely small angle of repose and the raw material supply step without an inner pipe led to the variation of the heat shrinkage rate exceeding the specified range due to significantly varied composition, similarly as Comparative Example 2.

In Comparative Example 4, raw material was supplied with an agitating device and Jingasa, but low shear rate in the extrusion step and low stretching rate in the longitudinal direction led to increased variation of the heat shrinkage rate in the film roll.

INDUSTRIAL APPLICABILITY

The heat-shrinkable polyester-based film roll of the present invention has high heat-shrinkability in the film longitudinal direction and very small variation of shrinkability in the width and the longitudinal directions, leading to and significantly low incidence of defects such as wrinkles and distortion of the film continuously mounted to objects by a wrap-around method and shrink-finished. Therefore, the film has high industrial application value.

EXPLANATION OF LETTERS OR NUMBERS

1: hopper
2: extruder
3: inner pipe
4: outlet of inner pipe
5: resin supply port
6: lunchbox container
7: film
8: wrinkle
9: lunchbox container
10: film

The invention claimed is:

1. A heat-shrinkable polyester-based film roll, comprising a core; and
a heat-shrinkable polyester-based film having a longitudinal direction as a main shrinkage direction that is wound around the core;
wherein the heat-shrinkable polyester-based film and the heat-shrinkable polyester-based film roll satisfy the following requirements (1) to (4):
(1) the heat-shrinkable polyester-based film comprises a polyester including ethylene terephthalate as a main constituent component, and at least one polyhydric alcohol selected from a group consisting of 1,4-cyclohexanedimethanol, neopentyl glycol, 1,4-butanediol, diethylene glycol, and 1,3-propanediol;
(2) all test piece films with a square of 10 cm×10 cm have a heat shrinkage rate in the longitudinal direction of 30% or more and 80% or less by immersion in hot water of 90° C. for 10 seconds followed by immersion in water of 25° C. for 10 seconds, wherein the test piece films are cutout at a center position in a roll width direction, and include
a first sample that is cutout from a portion provided at a position within 2 m on an inner side of a second end portion provided at an end of the film roll on a winding end side (surface layer side),
a final sample that is cutout from a portion provided at a position within 2 m on an inner side of a first end portion provided at an end of the film roll on a winding start side (core side), and
other samples that are cutout from a portion provided every about 100 m from the first sample cutout portion;
(3) all the test piece films have a heat shrinkage rate in the longitudinal direction of ±3% or less of an average heat shrinkage rate calculated from the heat shrinkage rates in the longitudinal direction measured by the method described in requirement (2); and
(4) the heat-shrinkable polyester-based film comprises fine particles in an amount of 300 to 1200 ppm in the heat-shrinkable polyester-based film.

2. The heat-shrinkable polyester-based film roll according to claim 1, further satisfying the following requirements (5) and (6):
(5) all the test piece films have a heat shrinkage rate in a width direction corresponding to a direction orthogonal to the longitudinal direction of −20% or more and 20% or less measured by the method described in requirement (2); and
(6) all the test piece films have a heat shrinkage rate in the width direction of ±3% or less of an average heat shrinkage rate calculated from the heat shrinkage rate in the width direction measured by the method described in requirement (2).

3. The heat-shrinkable polyester-based film roll according to claim 1, wherein the heat-shrinkable polyester-based film has an effective winding length of 1000 m or more and 20000 m or less.

4. The heat-shrinkable polyester-based film roll according to claim 1, wherein the heat-shrinkable polyester-based film has a width of 300 mm or more and 2500 mm or less.

5. The heat-shrinkable polyester-based film roll according to claim 1, wherein the heat-shrinkable polyester-based film has a thickness of 5 µm or more and 100 µm or less.

6. The heat-shrinkable polyester-based film roll according to claim 1, further satisfying the following requirement (7):
(7) all the test piece films prepared by the method described in requirement (2) have an amorphous component in an amount within a range of ±2 mol % or less of an average amount of the amorphous component of all the test piece films.

7. The heat-shrinkable polyester-based film roll according to claim 1, wherein the fine particles have an average particle diameter within a range of 0.05 to 3.0 µm as measured by a Coulter counter.

* * * * *

UNITED STATES PATENT AND TRADEMARK OFFICE
CERTIFICATE OF CORRECTION

| | | |
|---|---|---|
| PATENT NO. | : 12,509,564 B2 | Page 1 of 1 |
| APPLICATION NO. | : 18/003752 | |
| DATED | : December 30, 2025 | |
| INVENTOR(S) | : Ishimaru et al. | |

It is certified that error appears in the above-identified patent and that said Letters Patent is hereby corrected as shown below:

On the Title Page

Item (73) Assignee, -- TOYOBA CO., LTD. -- should be -- TOYOBO CO., LTD. --

Signed and Sealed this
Tenth Day of February, 2026

John A. Squires
*Director of the United States Patent and Trademark Office*